Dec. 22, 1931.  F. J. BAST  1,837,397
RECORDER CONTROLLER
Filed Dec. 11, 1930  2 Sheets-Sheet 1

WITNESS
G. V. Rasmussen

INVENTOR
FRANK J. BAST
BY
Briesen Schrenk
ATTORNEYS

Dec. 22, 1931.  F. J. BAST  1,837,397
RECORDER CONTROLLER
Filed Dec. 11, 1930  2 Sheets-Sheet 2
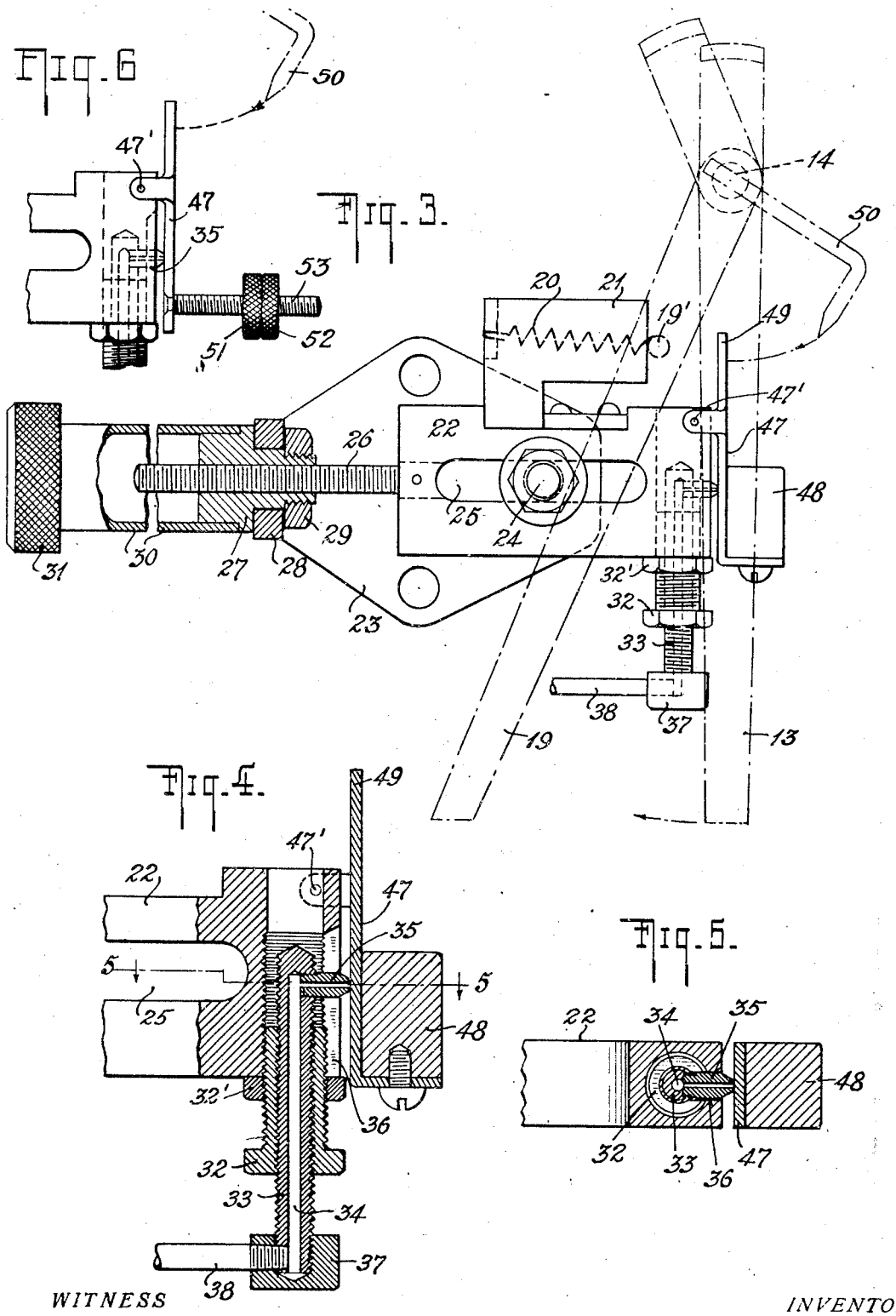
WITNESS
INVENTOR
FRANK J. BAST
BY
ATTORNEYS Patented Dec. 22, 1931

1,837,397

UNITED STATES PATENT OFFICE

FRANK J. BAST, OF QUEENS VILLAGE, NEW YORK, ASSIGNOR TO CHARLES J. TAGLIABUE MFG. CO., OF BROOKLYN, NEW YORK, A CORPORATION OF NEW YORK

RECORDER CONTROLLER

Application filed December 11, 1930. Serial No. 501,719.

My invention relates to recorder controllers operative both to record the temperatures or pressures prevailing at a selected point and to control the maximum temperature or pressure at such point. More specifically, my invention relates to a mechanism of this type wherein fluctuations in the temperature or pressure at such selected point are utilized to control the flow of pressure fluid to and from a diaphragm valve or other servo-motor to control the closing and opening thereof whereby the flow of a heating or other medium through a conduit controlled by said valve or motor to such point is regulated.

It is an object of the invention to provide an instrument of this type which is simple and durable in construction, and accurate and reliable in operation.

It is a further object of the invention to provide an adjusting mechanism for a recorder-controller whereby the temperature or pressure and the rate of change of such temperature or pressure at said selected point may be regulated and controlled.

Figure 2:
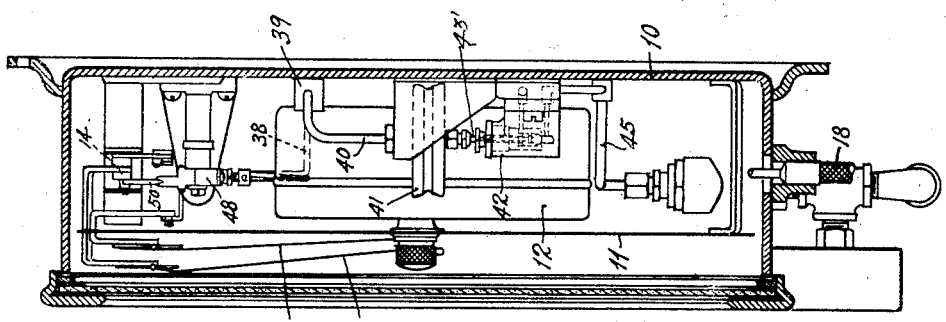
Figure 1:
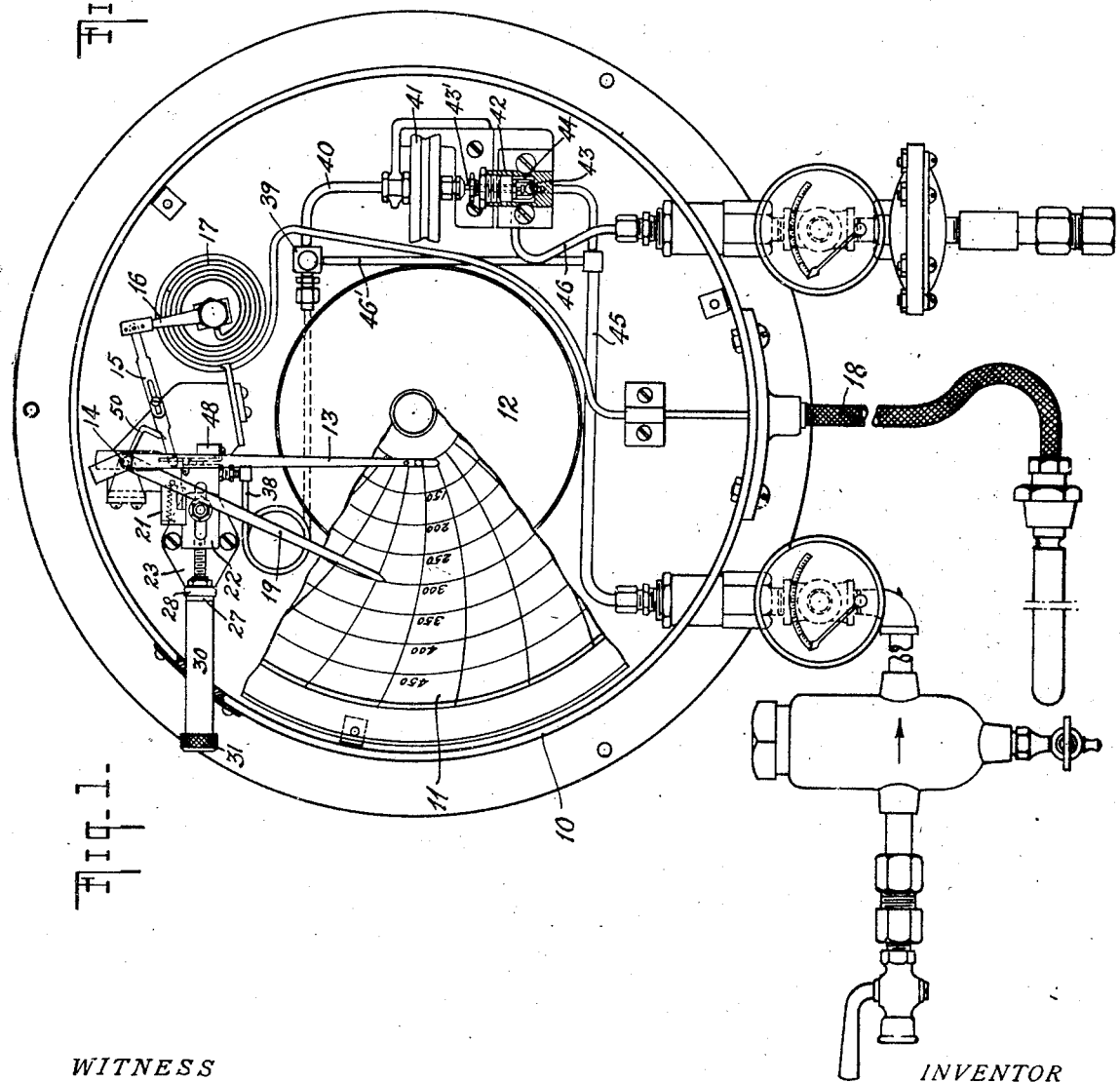

Other objects and advantages of my invention will become apparent from the following description taken in connection with the accompanying drawings which illustrate by way of example a preferred form of my invention. In said drawings:

Fig. 1 is a front view of the recorder controller with part of the recording sheet and its support removed to show the interior structure; Fig. 2 is a central vertical section taken through the recorder controller; Fig. 3 shows the adjusting mechanism on an enlarged scale; Fig. 4 is a vertical section through a part of the mechanism shown in Fig. 3; Fig. 5 is a section along the line 5—5 of Fig. 4; and Fig. 6 is a detail showing a modification.

The present application is a continuation in part of my copending application Serial No. 385,028, filed August 10, 1929.

The numeral 10 indicates a casing of any suitable type within which is rotatably supported a recording sheet 11 operated by clockwork mechanism 12 in a manner well known in the art. The sheet 11 is engaged by a pen-arm or stylus 13 which is pivoted upon a stud 14 fixed within the case 10. The stylus 13 is actuated by any suitable responsive mechanism, and in the embodiment illustrated is connected by a link 15 to an arm 16 fixed to the inner end of a Bourdon spring 17. The latter is connected by a capillary tube to a source of pressure, such as a thermostatic bulb, by means of the connection 18. It will be understood that the outer end of the spring 17 is fixed to the casing while the inner end is free to move in response to changes in the pressure of the fluid in such spring.

Pivoted concentrically with the stylus 13 is a setting pointer or arm 19 which is adapted to overlie the sheet 11 as shown in Fig. 1. The setting of the pointer 19 predetermines, by means of the mechanism described hereinafter, the maximum temperature or pressure at the point at which is located the thermostatic bulb or equivalent responsive mechanism connected to the Bourdon spring 17. The pointer 19 is urged by a spring 20 against an abutment 21 (Fig. 3) positioned on a block 22. A pin 19' on the pointer may serve simultaneously to anchor the spring 20 and to engage the abutment 21.

The block 22 is slidably mounted upon a base 23 fixed within the casing 10 and is guided in its sliding movement by means of a bolt 24 fixed to the base and passing through an elongated slot 25 in such block. A screw 26 is fixed at one end to the block 22 and passes through a correspondingly threaded sleeve 27 which is held in fixed relation with respect to the block 23 by means of a collar 28 fixed to the base 23 and surrounding a reduced section of such sleeve. The inner end of the sleeve 27 is threaded to receive a nut 29 which provides an abutment upon the inner side of the collar 28. A rod 30 is connected to the sleeve 27 and extends through the casing 10 to the outside thereof and is provided with a knurled end 31. By rotating the rod 30 the block 22 may be shifted longitudinally and the pointer 19 correspondingly adjusted without opening the casing 10.

The inner end of the block 22 is provided with a tapped hole (Fig. 4) which receives an internally and externally threaded member 32. An externally threaded screw 33 is received within the member 32. The screw 33 is provided with an axial channel 34 which communicates at its upper end with a nozzle 35 which projects through a slot 36 cut thru the right-hand section of the block 22 as shown in Fig. 4. The outlet end of the latter is planar for the purpose to be described hereinbelow. The member 32 is externally threaded right-hand and internally left-hand so that upon revolution thereof the screw 33, which is threaded left-hand, is given an axial or longitudinal movement free of rotation. The lower end of the screw 33 is fitted with a head or cap 37 which is tapped to receive the threaded end of an air conduit 38 which is soldered to the head and communicates with the channel 34. It will be clear that upon rotation of the member 32 the nozzle 35 will be moved upward or downward. The member 32 may be secured in selected position by a lock nut 32'.

The conduit 38 is connected to a block 39 (Fig. 1). The latter is connected by means of a pipe 40 with the interior of an expansible diaphragm 41 which is operatively associated with a ball valve 42. The valve may be composed of a ball 43 which controls the communication between the valve chamber 44 and an air supply conduit 45. The ball may be urged toward the open position by a spring or by the pressure of the fluid in conduit 45, and upon expansion of the diaphragm is forced into closed position against its seat by a stem 43' which is engaged by the diaphragm. The stem is guided within an enlarged bore in the valve body and is provided with a head at its inner end which, when the ball 43 is in open position, closes such bore. When the stem has been forced inwardly by the diaphragm 41 to force the ball 43 against its seat, the air or other pressure fluid in the chamber 44 is exhausted into the atmosphere through such enlarged bore. The valve chamber is connected by means of a pipe 46 with a diaphragm casing of a diaphragm valve or other suitable servo-motor adapted to control the flow of heating or other fluid to the vessel whose temperature or pressure is being controlled. A conduit 46' connects the air supply pipe 45 with the block 39. The block has a small hole about 0.010" in diameter through which air is supplied to the diaphragm 41 and to the nozzle 35. The orifice of the latter is about 0.015" in diameter, and when open, permits all of the air going through block 39 to escape therethrough, so that there is no pressure in the diaphragm 41.

Pivoted at 47' upon the block 22 above the nozzle 35 is a plate or flap valve 47 counterweighted at 48 and adapted to cover the orifice or outlet end of the nozzle 35 so as to prevent the escape of air therefrom. Due to the fact that the nozzle outlet is cut along a plane, an air-tight engagement between the valve 47 and nozzle 35 is assured. The flap valve 47 has a portion 49 thereof extending above its pivot and located in the path of movement of a lever 50 (Figs. 1 and 3) pivoted about the pivot of the stylus 13 and fixed to the latter so as to move therewith.

The operation of my improved mechanism is as follows: In the normal position of the parts the flap valve 47 rests against the outlet end of the nozzle as shown in the drawings, i. e. the nozzle 35 is closed. Air from pipe 45 is charged into diaphragm 41 through block 39 and pipe 40; the diaphragm expands and engages the valve pin or stem 43' of the valve 42 and forces the ball 43 to close the communication between the valve chamber 44 and pipe 45, so that the supply of air to the valve is cut off. Simultaneously the pipe 46 is placed in communication with the external atmosphere. In this manner the supply of compressed air to the servo-motor through the pipe 46 is cut off and the air in such motor is discharged. In the embodiment of the invention illustrated such discharge of the air causes the valve controlled by the servo-motor to open and to remain open so that a hot fluid or other medium is fed to the vessel or apparatus whose temperature or pressure is being controlled.

It will be understood that the temperature or pressure of such apparatus will be indicated upon the chart 11 by means of the stylus 13. Should the temperature (or pressure) rise above a predetermined value, as indicated by the setting of the arm 19 and consequently by the position of the flap valve 47, the lever 50 will engage the extension 49 of such valve and oscillate the same to open partially the nozzle 35. A portion of the air in diaphragm 41 is thus permitted to discharge through the nozzle 35 and the ball valve 43 permitted to rise under the action of a spring to close partially the communication between pipe 46 and the atmosphere and to open partly the inlet of pipe 45 into the valve chamber 44. Sufficient air is thereupon charged by the pipe 45 into pipe 46 and thence into the servo-motor to depress the diaphragm thereof to an extent sufficient to cause the feed-valve controlled thereby to feed just enough fluid, such as steam, into the apparatus to maintain the temperature (or pressure) therein at the predetermined value.

It was pointed out above that the nozzle orifice is larger than the opening in block 39; this permits the air in the diaphragm 41 to be rapidly discharged to cause rapid closing of the feed-valve. The rapidity with which this discharge takes place may be controlled by vertically adjusting the nozzle 35. By moving the nozzle toward the pivot 47' of the flap valve 47, the air escaping from the nozzle is throttled, and greater angular displacement of the valve 47 is required than when the nozzle is positioned further away from the pivot to expose fully the nozzle orifice and permit unhindered discharge of the air. Such throttling of the air is desirable when the point at which the temperature is taken heats slowly; in such event, therefore, the nozzle is positioned near the fulcrum 47'. When, on the other hand, the point at which the temperature is taken heats rapidly, the nozzle is positioned further away from the fulcrum.

I prefer to make the distance between the fulcrum 14 and the pin 19' substantially equal to the distance between such fulcrum and the end of the lever 50; as a result the point at which the pin 19' engages the abutment 21 corresponds to the point at which the lever 50 strikes the flap valve extension 49, so that the angular relationship between pointer and stylus is always the same.

My improved recorder-controller can be so adjusted (as by varying the vertical position of the nozzle 35 with respect to the fulcrum 47') that a practically straight temperature or pressure line can be obtained regardless of whether the temperature or pressure fluctuations at the point measured are great or small as compared with the point where the heat is applied.

Fig. 6 illustrates a modified structure wherein the weight which urges the flap valve 47 against the mouth of the nozzle 35 is adjustable with respect to such nozzle, so that the pressure against the latter may be maintained substantially constant regardless of the position thereof. The adjustable weight may take the form of two nuts 51 and 52 mounted upon a stud 53 fixed to the flap valve 47 at the bottom thereof and serving to lock each other in adjusted position. When the nozzle 35 is adjusted upwardly, the nuts 51 and 52 are moved inwardly, i. e. toward the valve 47; while upon adjustment of the nozzle downwardly, the nuts are moved outwardly, so that the distance between such nuts and the nozzle mouth is kept substantially the same. The instrument is thus made equally sensitive for all positions of the nozzle 35.

I desire it to be understood that where in the claims I speak of "an element responsive to variations in temperature or pressure" I refer to a structure or assembly composed of one or more parts which move in response to such temperature or pressure variations and are capable of applying a force against the valve at the proper time to open the same. In the form of the invention illustrated, this element is composed of the Bourdon spring 17, arm 16, link 15, the portion of pen arm 13 lying between the lever 50 and the point of connection of such pen arm and link 15, pivot 14, and lever 50. Certain of the claims are more specific to the member (e. g. the lever 50) which operates directly upon the valve 47, and in such claims I have designated the part or parts which actuate such member in response to temperature or pressure variations as "mechanism responsive to variations in temperature or pressure" which, in the illustrated form of the invention, is composed of the Bourdon spring 17, arm 16, link 15, and the portion of pen arm 13 lying between the lever 50 and the point of connection of such pen arm and link 15.

Variations may be resorted to within the scope of the appended claims without departing from the spirit of the invention.

I claim:

1. In a recorder controller, the combination with a pressure fluid-operated servo-motor arranged to control the feed of a treating fluid to an apparatus, of means for controlling the supply of pressure fluid to said motor and the discharge of fluid therefrom, comprising a normally stationary nozzle having an orifice, a valve controlling said orifice, an element responsive to variations in temperature or pressure at a selected remote point and operatively associated with said valve to control such orifice when the temperature or pressure at said point reaches a predetermined value to regulate the feed of fluid to said motor, a pen arm movable with said element, and means associated with said nozzle for adjusting the same along a straight line, whereby the limiting temperature or pressure at said selected point may be varied.

2. In a recorder controller, the combination with a pressure fluid-operated servo-motor arranged to control the feed of a treating fluid to an apparatus, of means for controlling the supply of pressure fluid to said motor and the discharge of fluid therefrom, comprising a nozzle having an orifice, a valve controlling said orifice, an element responsive to variations in temperature or pressure at a selected point and operatively associated with said valve to control such orifice when the temperature or pressure at said point reaches a predetermined value to regulate the feed of fluid to said motor, and means whereby the rate of opening of said valve may be varied for equal rates of movement of said element, so that the rate of change in the feed of the treating fluid may be controlled.

3. In a recorder controller, the combination with a pressure fluid-operated servo-motor arranged to control the feed of a treating fluid to an apparatus, of means for controlling the supply of pressure fluid to said motor and the discharge of fluid therefrom, comprising a nozzle having an orifice, a valve controlling said orifice, and an element responsive to variations in temperature or pressure at a selected point and operatively associated with said valve to control such orifice when the temperature or pressure at said point reaches a predetermined value to regulate the feed of fluid to said motor, said valve comprising a plate pivoted at a distance from said nozzle, and said nozzle being adjustable with respect to the fulcrum of said plate, whereby the rate of opening of said valve may be varied for equal rates of movement of said element, so that the rate of change in the feed of the treating fluid may be controlled.

4. In a recorder controller, the combination with a pressure fluid-operated servo-motor arranged to control the feed of a treating fluid to an apparatus, of means for controlling the supply of pressure fluid to said motor and the discharge of fluid therefrom, comprising a nozzle having an orifice, a valve controlling said orifice, an element responsive to variations in temperature or pressure at a selected point and operatively associated with said valve to control such orifice when the temperature or pressure at said point reaches a predetermined value to regulate the feed of fluid to said motor, means associated with said nozzle for adjusting the same along a straight line, whereby the limiting temperature or pressure at said selected point may be varied, and means whereby the rate of opening of said valve may be varied for equal rates of movement of said element, so that the rate of change in the feed of the treating fluid may be controlled.

5. In a recorder controller, the combination with a pressure fluid-operated servo-motor arranged to control the feed of a treating fluid to an apparatus, of means for controlling the supply of pressure fluid to said motor and the discharge of fluid therefrom, comprising a nozzle having an orifice, a valve controlling said orifice and pivoted at a distance from said nozzle, an element responsive to variations in temperature or pressure at a selected point and operative, when the temperature or pressure at said point reaches a predetermined value, to oscillate said valve to regulate the feed of fluid to said motor, means associated with said nozzle for adjusting the same along a straight line, whereby the limiting temperature at said selected point may be varied, and means for adjusting the nozzle with respect to the pivot of said valve, whereby the rate of opening of said valve may be varied for equal rates of movement of said element, so that the rate of change in the feed of the treating fluid may be controlled.

6. In a recorder controller, the combination with a casing and a pressure fluid-operated servo-motor arranged to control the feed of a treating fluid to an apparatus, of means for controlling the supply of pressure fluid to said motor and the discharge of fluid therefrom, comprising a nozzle having an orifice, a block supporting said nozzle, means for imparting translatory movement to said block, a pointer pivoted independently of said block and associated with said block and arranged to overlie the chart of the recorder, a valve carried by said block and normally closing said orifice, mechanism responsive to variations in temperature or pressure at a selected point, a pen arm operated by said mechanism and overlying said chart, and a member connected to said pen arm and arranged to operate said valve, when the temperature or pressure at said point reaches a predetermined value, to regulate the feed or fluid to said motor.

7. The combination as set forth in claim 6 wherein said pointer and said pen arm are pivoted coaxially.

8. In a recorder controller, the combination with a casing and a pressure fluid-operated servo-motor arranged to control the feed of a treating fluid to an apparatus, of means for controlling the supply of pressure fluid to said motor and the discharge of fluid therefrom, comprising a nozzle having an orifice, a block supporting said nozzle, means for imparting translatory movement to said block, a pointer pivoted in said casing and arranged to overlie the chart of the recorder, means urging said pointer toward said block, an abutment on said block, a pin on said pointer adapted to engage said abutment, a valve carried by said block and normally closing said orifice, mechanism responsive to variations in temperature or pressure at a selected point, a pen arm operated by said mechanism and overlying said chart, and a member connected to said pen arm and arranged to operate said valve, when the temperature or pressure at said point reaches a predetermined value, to regulate the feed of fluid to said motor, said pointer and pen arm being pivoted coaxially.

9. In a recorder controller, the combination with a casing and a pressure fluid-operated servo-motor arranged to control the feed of a treating fluid to an apparatus, of means for controlling the supply of pressure fluid to said motor and the discharge of fluid therefrom, comprising a nozzle having an orifice, a block supporting said nozzle, means for imparting translatory movement to said block, a pointer pivoted in said casing and arranged to overlie the chart of the recorder, means urging said pointer toward said block, an abutment on said block, a pin on said pointer adapted to engage said abutment, a valve carried by said block and normally closing said orifice, mechanism responsive to variations in temperature or pressure at a selected point, a pen arm operated by said mechanism and overlying said chart, and a member connected to said pen arm and arranged to operate said valve, when the temperature or pressure at said point reaches a predetermined value, to regulate the feed of fluid to said motor, said pointer and pen arm being pivoted coaxially, and the distances from the pivot of the pointer and arm to the pin on said pointer, and to the part of said valve-operating member which engages said valve, being substantially equal, whereby the angular relation between the pointer and arm at the distance of operation of the valve is maintained constant for all predetermined limiting positions of the arm.

10. The combination as set forth in claim 6 wherein the valve is pivoted on said block, and the nozzle is adjustable toward and away from such pivot.

11. In a recorder controller, in combination, a casing, a pressure fluid-operated servo-motor arranged to control the feed of a treating fluid to an apparatus, means for controlling the supply of pressure fluid to said motor and the discharge of fluid therefrom, comprising a normally stationary nozzle having an orifice, a valve controlling said orifice, an element responsive to variations in temperature or pressure at a selected remote point and operatively associated with said valve to control such orifice when the temperature or pressure at said point reaches a predetermined value, to regulate the feed of fluid to said motor, and means associated with said nozzle and extending through said casing to be operable from the exterior thereof for adjusting said nozzle with respect to said element, whereby the limiting temperature or pressure at said selected point may be varied.

12. In a recorder controller, the combination with a pressure fluid-operated servo-motor arranged to control the feed of a treating fluid to an apparatus, of means for controlling the supply of pressure fluid to said motor and the discharge of fluid therefrom, comprising a nozzle having an orifice, a valve controlling said orifice, mechanism responsive to variations in temperature or pressure at a selected point and operatively associated with said valve to control such orifice when the temperature or pressure at said point reaches a predetermined value to regulate the feed of fluid to said motor, said valve comprising a plate pivoted at a distance from said nozzle, said nozzle being adjustable with respect to the fulcrum of said plate, and means effective upon said valve to urge the same against said nozzle, said means being adjustable to maintain the pressure against the nozzle substantially constant for all positions of the latter.

13. In a recorder controller, the combination with a pressure fluid-operated servo-motor arranged to control the feed of a treating fluid to an apparatus, of means for controlling the supply of pressure fluid to said motor and the discharge of fluid therefrom, comprising a nozzle having an orifice, a valve controlling said orifice, an element responsive to variations in temperature or pressure at a selected point and operatively associated with said valve to control such orifice when the temperature or pressure at said point reaches a predetermined value to regulate the feed of fluid to said motor, said valve comprising a plate pivoted at a distance from said nozzle, and said nozzle being adjustable with respect to the fulcrum of said plate, whereby the rate of opening of said valve may be varied for equal rates of movement of said element, so that the rate of change in the feed of the treating fluid may be controlled, and a weight effective upon said valve to urge the same against the nozzle, the weight being adjustable to maintain the pressure against the nozzle substantially constant for all positions of such nozzle.

FRANK J. BAST.